United States Patent
Stray et al.

(10) Patent No.: US 12,413,061 B2
(45) Date of Patent: Sep. 9, 2025

(54) ELECTRICAL BUS SYSTEM COMPRISING A PLURALITY OF BUS SEGMENTS

(71) Applicant: GENTEX CORPORATION, Zeeland, MI (US)

(72) Inventors: Joel A. Stray, Hudsonville, MI (US); Gary J. Dozeman, Zeeland, MI (US); Stephen F. Richlich, Holland, MI (US); Matthew A. Koppey, Holland, MI (US); George A. Neuman, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 506 days.

(21) Appl. No.: 17/835,075

(22) Filed: Jun. 8, 2022

(65) Prior Publication Data

US 2022/0399707 A1 Dec. 15, 2022

Related U.S. Application Data

(60) Provisional application No. 63/210,163, filed on Jun. 14, 2021.

(51) Int. Cl.
*H02G 3/30* (2006.01)
*G02F 1/1345* (2006.01)
(Continued)

(52) U.S. Cl.
CPC ............ *H02G 3/30* (2013.01); *G02F 1/1345* (2013.01); *G02F 1/163* (2013.01); *H02G 3/08* (2013.01)

(58) Field of Classification Search
CPC .................................................. G02F 2201/56
See application file for complete search history.

(56) References Cited

U.S. PATENT DOCUMENTS

| 2004/0012836 A1 | 1/2004 | Li |
| 2013/0222878 A1 | 8/2013 | Greer et al. |

(Continued)

FOREIGN PATENT DOCUMENTS

| CN | 108761952 A | * | 11/2018 | |
| CN | 109154751 A | * | 1/2019 | ......... G02F 1/13452 |

(Continued)

OTHER PUBLICATIONS

International Search Report dated Sep. 23, 2022, for corresponding PCT application No. PCT/US2022/032610, 3 pages.

(Continued)

*Primary Examiner* — Paul C Lee
(74) *Attorney, Agent, or Firm* — Price Heneveld LLP; Brian James Brewer

(57) ABSTRACT

An electro-optic element comprises a first substrate; a second substrate generally parallel to the first substrate; a first bus having a first bus segment disposed on an inner surface of the first substrate and extending along a first portion of a perimeter of the first substrate and a second bus segment disposed on an inner surface of first substrate and extending along a second portion of the perimeter of the first substrate. The second bus segment is in a spaced apart relationship with first bus segment. A second bus has a third bus segment and a fourth bus segment is disposed on the second substrate, each extending along a portion of the perimeter of the second substrate. A controller is configured to be in selective electrical communication with first and second buses and to independently control a voltage applied to each of the bus segments.

17 Claims, 5 Drawing Sheets

(51) Int. Cl.
*G02F 1/163* (2006.01)
*H02G 3/08* (2006.01)

(56) References Cited

U.S. PATENT DOCUMENTS

| | | |
|---|---|---|
| 2016/0097960 A1 | 4/2016 | Dixit et al. |
| 2017/0100991 A1 | 4/2017 | Cammenga et al. |
| 2018/0196323 A1* | 7/2018 | Wang ...................... G02F 1/155 |
| 2019/0265569 A1 | 8/2019 | Miyazaki |
| 2020/0183244 A1* | 6/2020 | DeNolf ..................... E06B 9/24 |
| 2021/0026163 A1 | 1/2021 | Richlich |

FOREIGN PATENT DOCUMENTS

| | | | |
|---|---|---|---|
| CN | 112558371 A * | 3/2021 | ........... G02F 1/1516 |
| KR | 101535100 B1 | 7/2015 | |
| WO | 2012162502 A1 | 11/2012 | |

OTHER PUBLICATIONS

Written Opinion dated Sep. 23, 2022, for corresponding PCT application No. PCT/US2022/032610, 5 pages.

* cited by examiner

ELECTRICAL BUS SYSTEM COMPRISING A PLURALITY OF BUS SEGMENTS

CROSS REFERENCE TO RELATED APPLICATIONS

This application claims the benefit of and priority to U.S. Provisional Patent Application No. 63/210,163, filed on Jun. 14, 2021, entitled "Electrical Bus System," the entire disclosure of which is hereby incorporated herein by reference.

FIELD OF THE DISCLOSURE

This disclosure relates generally to bus systems, and in particular, to segmented bus systems for electro-optic devices.

BACKGROUND

In large-area devices such as windows and sunroofs that comprise electro-optic elements, it may be challenging to achieve adequate speed and uniformity of darkening and clearing. The electrical bus design is instrumental to reaching fast and uniform darkening speeds. A thicker bus may increase speed, but it may cause problems with electro-optic elements. Currently-used bus arrangements may result in very slow transitions, may be extremely difficult to apply properly, and may result in performance issues in some configurations.

Buses that are opposite one another may necessitate a thicker cell spacing than desired due to the combined thickness of the buses. Even in configurations that do not have buses opposite one another, it is likely that the buses will cross over one another at least at some point, resulting in thickness interference.

A further challenge may arise when using flexible substrates such as plastic substrates for the electro-optic elements. It may be difficult to have buses adhere to the plastic surface without causing stress and/or cupping. This may be especially true for buses that extend around curved edges and/or corners.

Using a conductive tape as the bus may be desirable on straight sections of the electro-optic device but applying conductive tape around corners produces substantial forces on the substrate. Furthermore, there may be ripples and folds in the tape at the corners, which may result in stresses. The tape may not conform easily to the positioning and may pull away from the substrate or even cause the substrate to peel and cup, resulting in a non-flat substrate.

In configurations that use a monolithic bus and seal combination, it may be difficult to accurately position the bus and seal and to retain it in place during construction of the electro-optic device. Furthermore, a monolithic bus assembly may be expensive to manufacture as the bus may be cut from a single piece of material and the interior portion of the material then discarded.

SUMMARY

According to an aspect, an electro-optic element may comprise a first substrate having an inner surface; a second substrate having an inner surface opposed to the inner surface of the first substrate, the second substrate generally parallel to and coextensive with the first substrate; a first bus having a first bus segment disposed on the inner surface of the first substrate and extending along a length of a first portion of a perimeter of the first substrate and a second bus segment disposed on the inner surface of the first substrate and extending along a second portion of the perimeter of the first substrate; a second bus having a third bus segment disposed on the inner surface of the second substrate and extending along a first portion of a perimeter of the second substrate and in proximity to the first bus segment of the first bus and a fourth bus segment disposed on the inner surface of the second substrate and extending along a second portion of the perimeter of the second substrate and in proximity to the second bus segment of the first bus; and a controller configured to be in selective electrical communication with the first and second buses and capable of independently controlling a voltage applied to the first bus segment and the second bus segment of the first bus and a voltage applied to the third bus segment and the fourth bus segment portion of the second bus.

The second bus segment may be in a spaced apart relationship with the first bus segment of the first bus and the fourth bus segment may be in a spaced-apart relationship with the third bus segment of the second bus. The first and third bus segments may be straight. The second and fourth bus segments may be curved. The third bus segment may be disposed generally parallel to the first bus segment and the fourth bus segment may be disposed generally parallel to the second bus segment. An electrically insulating material may be disposed between first and second bus segments of the first bus and the corresponding third and fourth bus segments of the second bus so as to electrically isolate the first and second bus segments from the third and fourth bus segments. An end of the first bus segment may be angled and the angled end may be disposed against an end of the second bus segment, thereby increasing the interface with second bus segment. A finger may extend from one end of the first bus segment and may be configured to fit within an opening in an end of the second bus segment.

According to another aspect, an electrical bus system for an electro-optic element may comprise: a first bus segment and a second bus segment, each having a first end and a second end, disposed on a surface of a first substrate of the electro-optic element; and a third bus segment and a fourth bus segment, each having a first end and a second end, disposed on a surface of a second substrate of the electro-optic element, the surface of the second substrate being opposed to the surface of the first substrate, the second substrate generally coextensive with and parallel to the first substrate of the electro-optic element; wherein the first and second bus segments may be disposed around at least a portion of a perimeter of the surface of the first substrate; and wherein the third and fourth bus segments may be disposed around at least a portion of a perimeter of the surface of the second substrate.

The second end of the first bus segment may be in proximity to the first end of the second bus segment. At least the first and third bus segments may be straight. At least the second and fourth first bus segments may be curved. The third bus segment may be disposed generally parallel to and opposite the first bus segment and the fourth bus segment may be disposed generally parallel to and opposite the second bus segment. The third bus segment has generally the same configuration as the first bus segment and the fourth bus segment has generally the same configuration as the second bus segment. The electrical bus system of claim 8, wherein an electrically insulating material is disposed between the first bus segment and the third bus segment and between the second bus segment and the fourth bus segment in such a way as to electrically isolate the first and second bus segments from the third and fourth bus segments.

DETAILED DESCRIPTION

Buses for large-area devices may require equal, balanced anode and cathode representation in order to achieve desired performance. To further ensure desired performance characteristics, such as adequate speed of darkening and clearing and for solution phase balance of an electro-optic medium, it is desirable to have both electrode portions present.

Figure 1A:
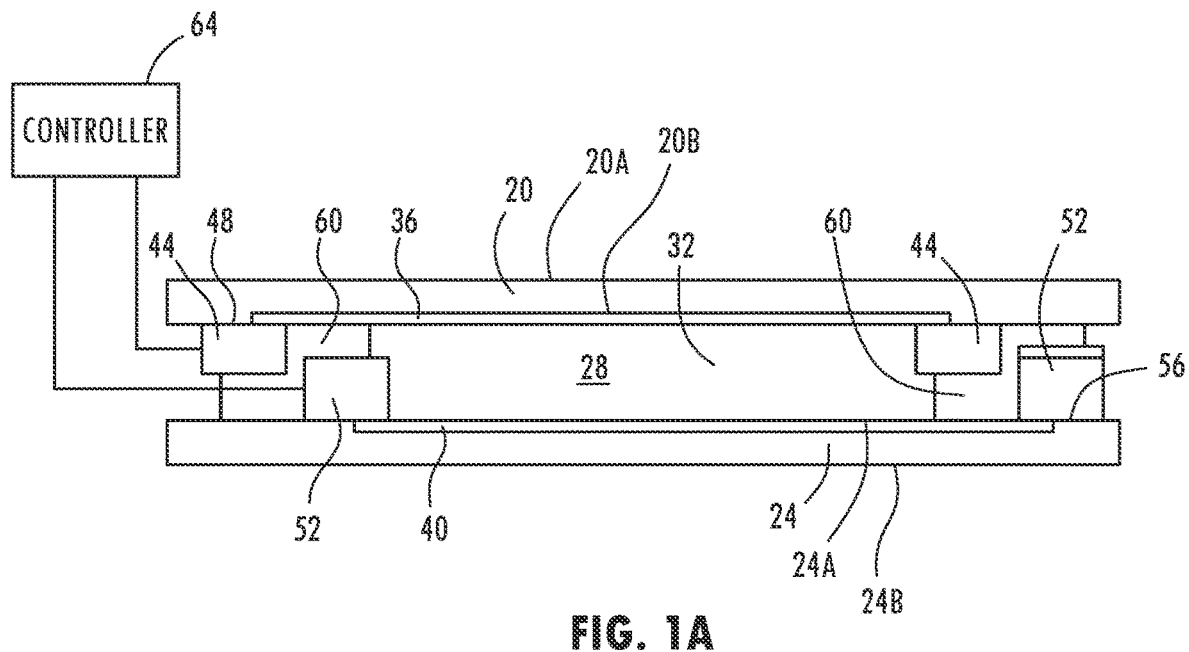
FIG. 1A illustrates a cross-sectional side view of a first embodiment of an electro-optic element having buses in accordance with this disclosure.
Figure 1B:
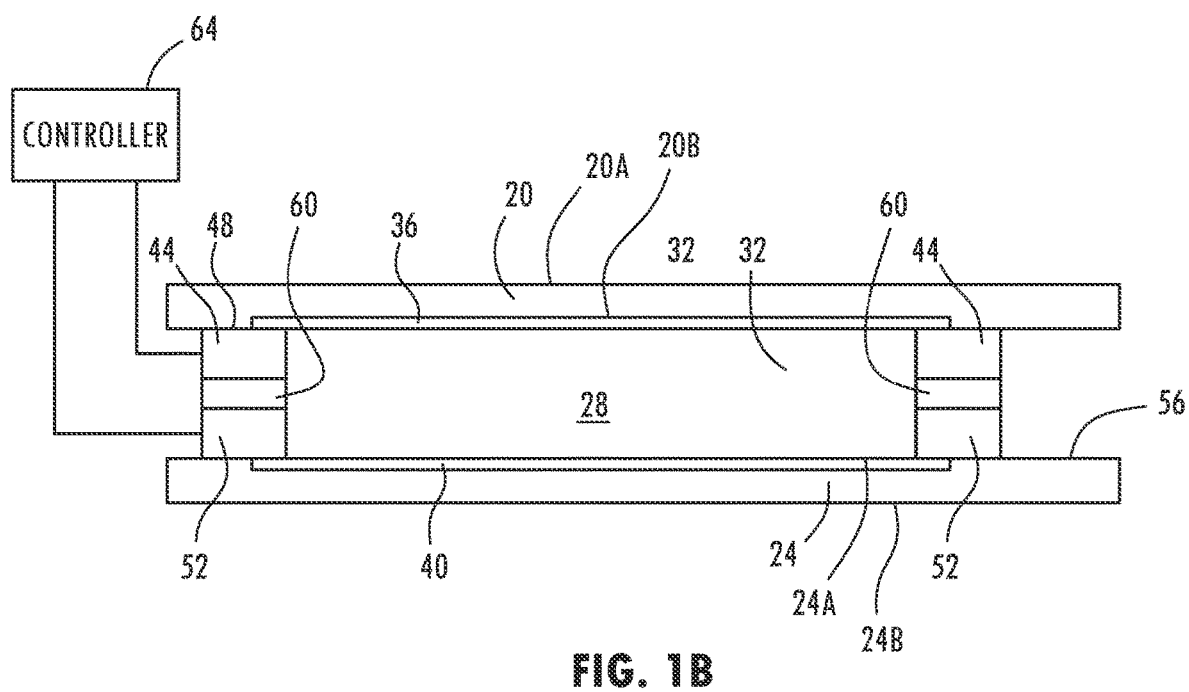
FIG. 1B illustrates a cross-sectional side view of a second embodiment of an electro-optic element having buses in accordance with this disclosure.

Referring to FIGS. 1A and 1B, a large-area device may comprise an electro-optic element, shown generally at 10. Electro-optic element 10 may comprise a first substrate 20 and an opposed second substrate 24 defining a cavity 28 therebetween. An electro-optic medium 32 may be disposed between first substrate 20 and second substrate 24 within cavity 28. First substrate 20 may have a first, outer surface 20A and a second, inner surface 20B, and second substrate 24 may have a third, inner surface 24A and a fourth, outer surface 24B. First and second substrates 20, 24 may be in a spaced-apart relationship and generally parallel to and coextensive with one another. One or more layers of electrically conductive coatings 36 may be disposed on second surface 20A of first substrate 20 and may serve as a first electrode for electro-optic element 10. Similarly, one or more layers of electrically conductive coatings 40 may be disposed on third surface 24A of second substrate 24 and may serve as a second electrode for electro-optic element 10. When a voltage is applied to electro-optic medium 32 through electrode coatings 36, 40, electro-optic medium 32 may be capable of changing properties, either darkening or clearing from a darkened state.

A first bus 44 may be disposed on second surface 20A of first substrate 20, generally along at least a portion of a perimeter 48 of first substrate 20; and a second bus 52 may be disposed on third surface 24A of second substrate 24, generally along at least a portion of a perimeter 56 of second substrate 24. First bus 44 may contact a portion of first electrode 36, and second bus 52 may contact a portion of second electrode 40.

As shown in FIG. 1A, first bus 44 may be disposed in a "stacked" configuration, opposed to second bus 52. An electrically insulating material 60 may be disposed between first bus 44 and second bus 52 to prevent first and second buses 44, 52 from contacting one another and shorting out electro-optic element 10. In some embodiments, electro-optic element 10 may be laminated. On a laminated electro-optic element 10, the gap between first bus 44 and second bus 52 may be filled prior to lamination. Filling in the gap may also address uneven portions within the laminate stack. This arrangement may result in a relatively thick electro-optic element 10, with first and second substrates 20, 24 spaced sufficiently far apart to accommodate first bus 44, second bus 52, and electrically insulating material 60.

As shown in FIG. 1B, in some embodiments, second bus 52 may extend adjacent to first bus 44. In this arrangement, first and second buses 44, 52 are disposed generally side-by-side. This arrangement may allow for a thinner device than described in reference to FIG. 1A as the space between first and second substrates 20, 24 may be less than the combined thicknesses of first and second buses 44, 52. In this arrangement, the gap between first bus 44 and second bus 52 may be filled with material to eliminate any air gap and to prevent air from reaching electro-optic medium 32.

A controller 64 may be configured to be in selective electrical communication with first and second buses 44, 52. Controller 64 may be configured to independently control a first voltage applied to first bus 44 and a second voltage applied to second bus 52. Applying first and/or second voltage to buses may cause electro-optic element 10 to darken or to clear by coloring or clearing electro-optic medium 32, thereby controlling the amount of light passing through electro-optic element 10.

Both first bus 44 and second bus 52 may comprise a non-continuous bus having a plurality of discrete bus segments 68. Bus segments 68 may be in balanced pairs, with each bus segment 68 of first bus 44 corresponding to a bus segment 68 in second bus 52. Each pair of bus segments 68 may be in a balanced, anodic and cathodic form, with one bus segment 68 of the pair being anodic and the other bus segment 68 of the pair being cathodic. At least one of the pairs of bus segments 68 in a pair of buses 44, 52 may comprise external contact wires or external contact portions 76. The wires or external contact portions 76 of bus segments 68 may extend past an edge of substrate 20, 24 to allow for an external electrical connection to the bus.

Figure 2A:
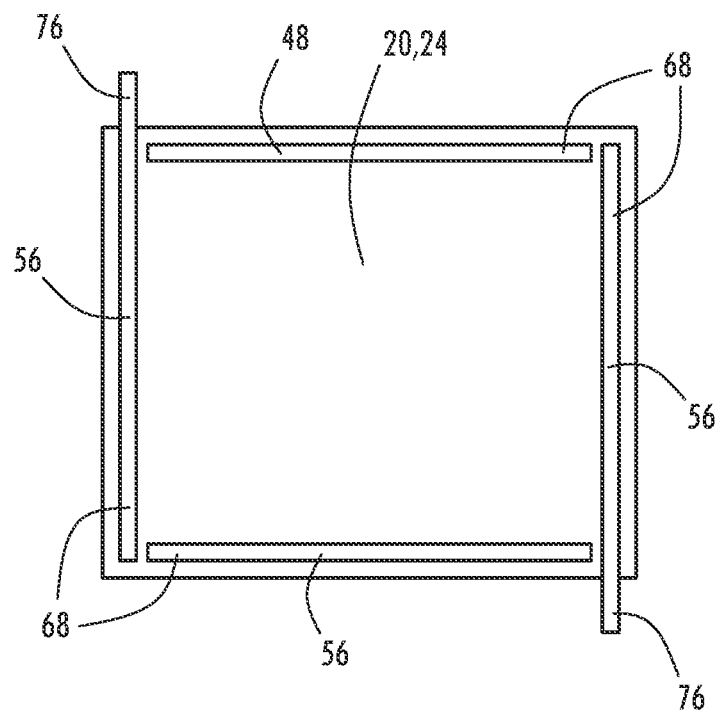
FIG. 2A illustrates an embodiment of a first bus arrangement on a substrate of an electro-optic element in accordance with this disclosure.
Figure 2B:
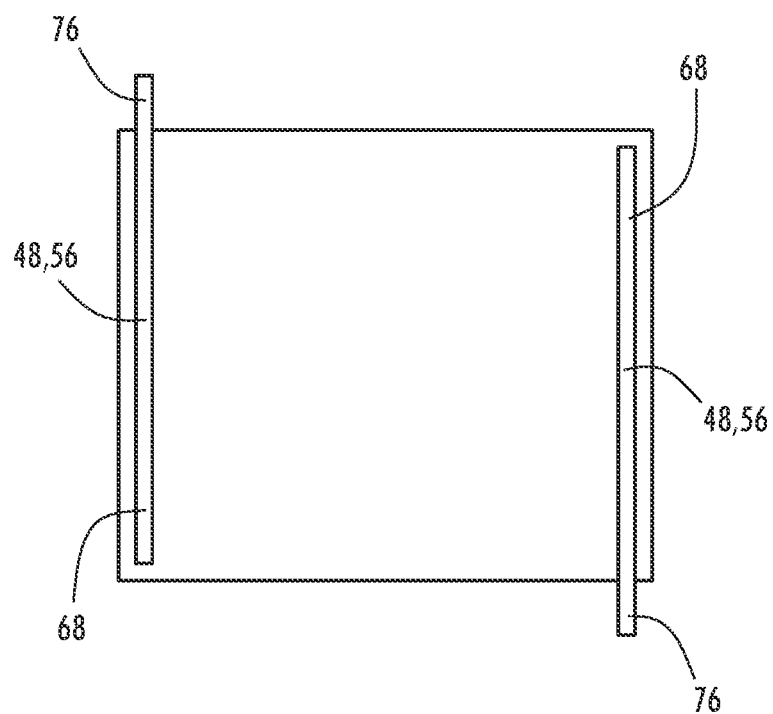
FIG. 2B illustrates an embodiment of a second bus arrangement on a substrate of an electro-optic element in accordance with this disclosure.

Each bus segment 68 may be configured to extend along a portion of perimeter 48, 56 of first or second substrate 20, 24. In some embodiments, perimeters 48, 56 of first and/or second substrates 20, 24 may comprise one or more generally straight sections. Straight bus segments 68 may extend along generally straight portions of perimeter 48, 56 of first and second substrates 20, 24. In some embodiments, as shown in FIG. 2A, straight bus segments 68 may be disposed along the generally straight sections of perimeters 48, 56 of first and second substrates 20, 24 to extend around all sides of substrate 20, 24. In some embodiments, as shown in FIG. 2B, bus segments 68 may be disposed along only some of the sections of perimeters 48, 56 of first and second substrates 20, 24. In either case, bus segments 68 may be independently powered, shorted, or powered in an opposite polarity to create unique darkening/clearing effects.

In some embodiments, straight bus segments 68 may comprise a conductive tape. The tape may comprise a metal portion and an electrically conductive (in the Z direction) pressure sensitive tape. Using a plurality of bus segments 68 including straight bus segments 68 comprising a tape may result in less waste than using a monolithic piece of material for first and second buses 44, 52.

Figure 3:
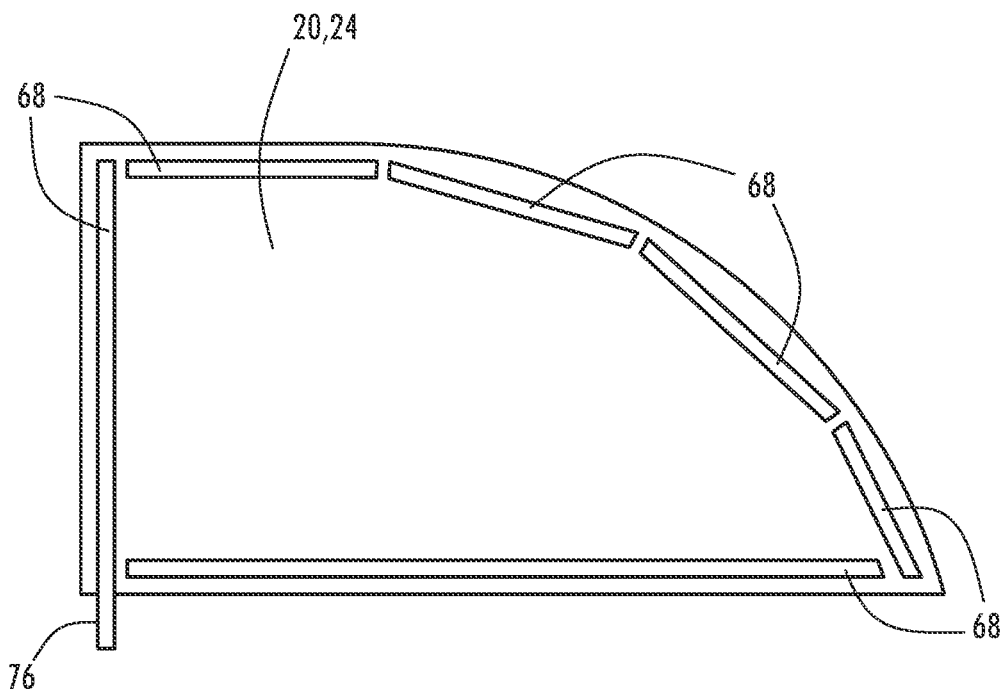
FIG. 3 illustrates an embodiment of a third bus arrangement on a substrate of an electro-optic element in accordance with this disclosure.
Figure 4:
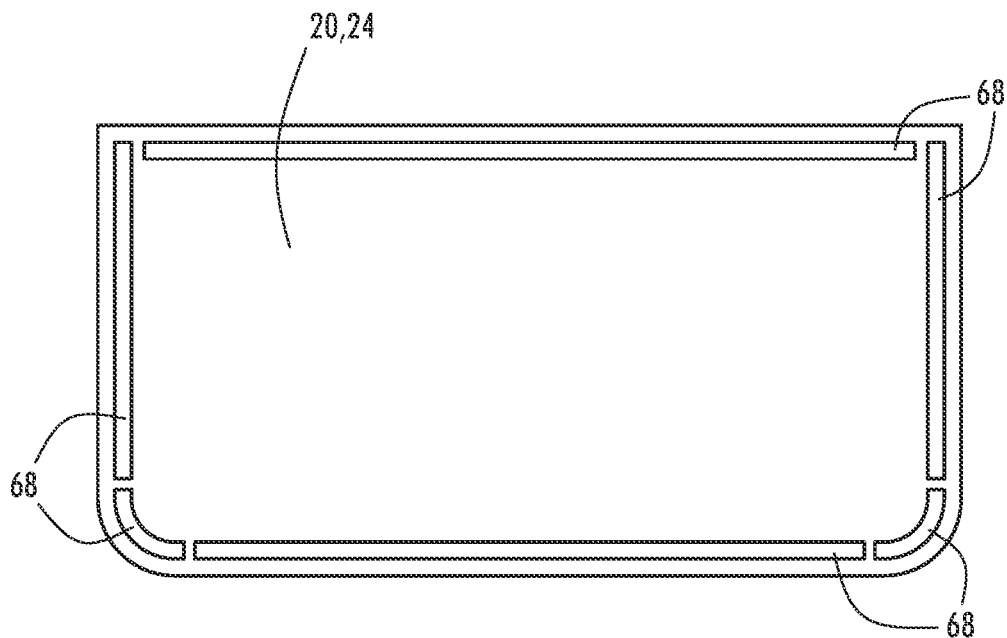
FIG. 4 illustrates an embodiment of a fourth bus arrangement on a substrate of an electro-optic element in accordance with this disclosure.
Figure 5:
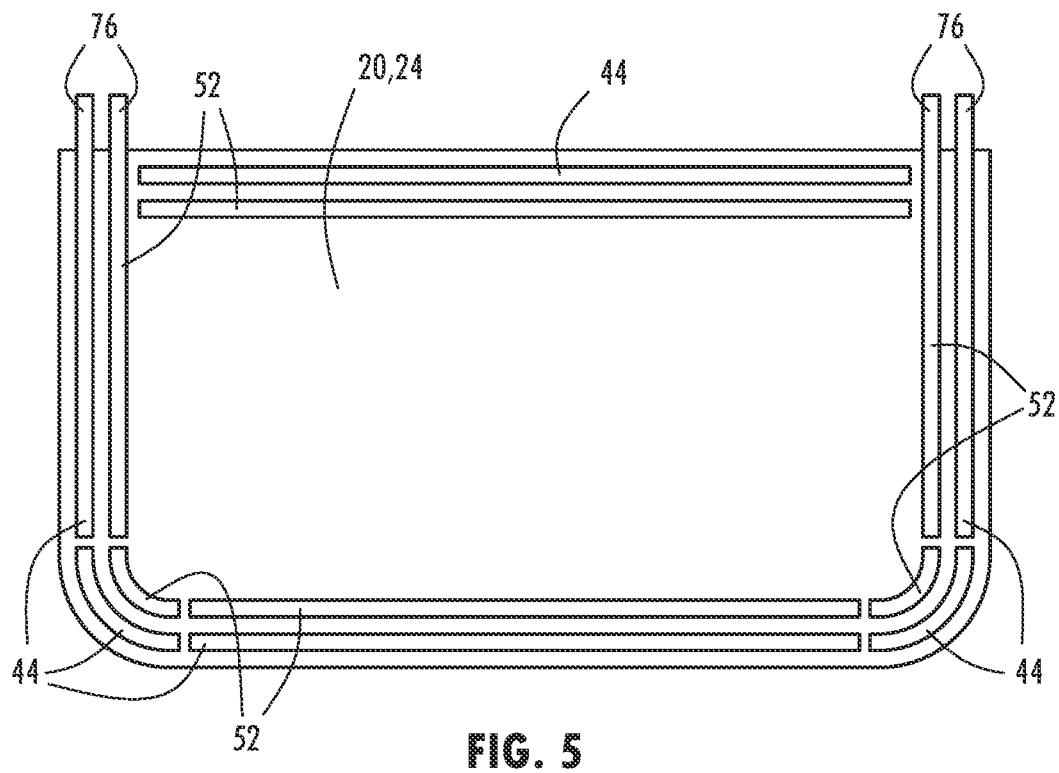
FIG. 5 illustrates a top view of an embodiment of a bus arrangement on an electro-optic element in accordance with this disclosure.

In some embodiments, bus segments 68 may need to conform to non-geometric shapes such as arcs, angles, and the like. As shown in FIGS. 3-5, electro-optic element 10 may have one or more curved portions of perimeter 48, 56. Straight bus segments 68 may be disposed along the straight portions of perimeter 48, 56. In addition, as shown in FIG. 3, a plurality of straight bus segments 68 may be disposed along the curved portion(s) of perimeter 48, 56. Straight bus segments 68 disposed along curved portions of perimeter 48, 56 may be short enough to remain in close proximity to perimeter 48, 56 and not extend far enough into the center of electro-optic element 10 to be visible to a viewer. The number of bus segments 68 chosen may involve a balance between the number of straight bus segments 68 to segment the curved portions of perimeter 48, 56 with straight sections while not decreasing performance due to resistance buildup as a result of having multiple gaps. As in the previous examples, at least one straight bus segment 68 may comprise an external contact portion 76 extending past the edge of substrate to allow for an external electrical connection to bus.

As shown in FIG. 4, in some embodiments, first and second buses 44, 52 may comprise a plurality of bus segments 68, some straight and some curved, disposed around perimeters 48, 56 of opposed surfaces of first and second substrates 20, 24 in order to provide the desired coverage. Curved bus segments, straight bus segments, or a combination of curved and straight bus segments 68 may be disposed along curved portions of perimeters 48, 56 of first and second substrates 20, 24 of electro-optic element 10. Curved bus segments 68 may be used on tighter curves or smaller-radius curves than straight bus portions. Curved bus segments 68 may be pre-formed to conform to a curved portion of perimeter 48, 56 of first and/or second substrate 20, 24. Pre-formed curved bus segments 68 may then be applied to substrate. During manufacture, bus segments 68 may be placed onto substrate after other layers, such as electrodes 36, 40, have been applied and cured, thereby simplifying manufacturing.

In some embodiments, (not shown) first and second buses 44, 52 may comprise only curved bus segments 68.

The use of bus segments 68, including straight bus segments 68 and/or curved bus segments 68, may reduce or eliminate the stresses and/or strains on the underlying substrate 20, 24. Particularly when plastic substrates are used, the use of bus segments 68 may reduce or prevent cupping of substrate 20, 24. It may also allow higher performance of electro-optic element 10.

As shown in FIG. 5, in some embodiments, first bus 44 and second bus 52 may be disposed to be generally parallel to one another along the length of perimeters 48, 56 of first and second substrates 20, 24 of electro-optic element 10. One bus 44, 52 or bus segments 68 from one bus may be closer to perimeter 48, 56 than the other bus 52,44 or bus segments 68 from other bus. Both buses may have at least one external contact portion 76 that extends past the edge of substrate 20, 24 to allow for an external electrical connection to bus. One of first and second buses 44, 52 may comprise the anode, and the other bus 44, 52 may comprise the cathode.

Figure 6A:
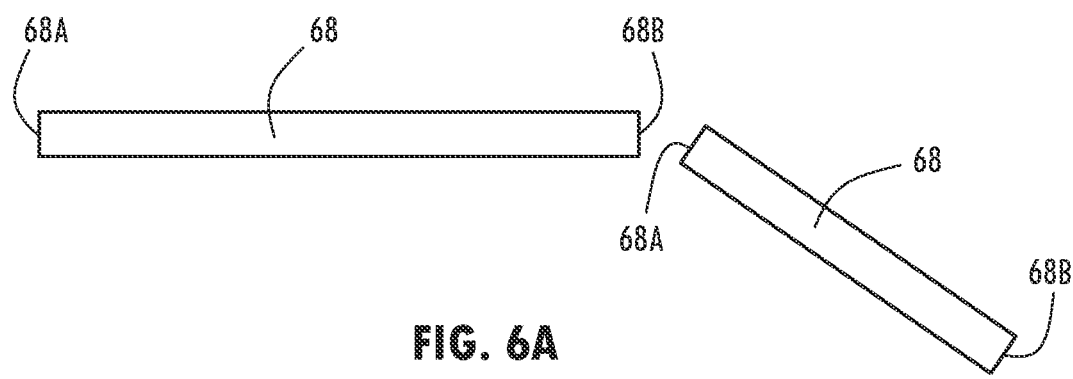
FIG. 6A illustrates a first configuration of the placement of two bus segments in relation to one another in accordance with this disclosure.

Referring now to FIGS. 6A-6D, each bus segment 68 may have a first end 68A and a second end 68B. First end 68A of one bus segment 68 may be in proximity to second end 68B of another bus segment 68. In some embodiments a gap may separate first end 68A of one bus segment 68 from second end 68B of another bus segment 68 so that the ends 68A, 68B of bus segments 68 do not contact one another, as shown in FIG. 6A. In this configuration, due to the space between the ends 68A, 68B of bus segments 68, there may be significant resistance between the two bus segments 68.

Figure 6B:
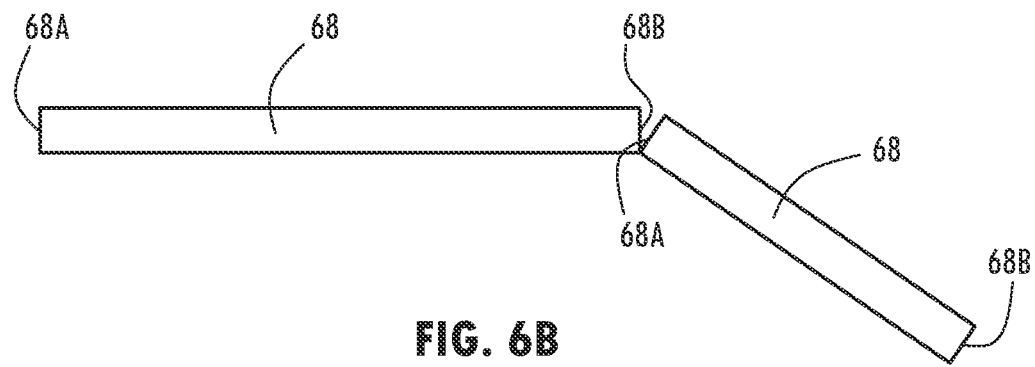
FIG. 6B illustrates a second configuration of the placement of two bus segments in relation to one another in accordance with this disclosure.

In some embodiments, as shown in FIG. 6B, first end 68A of one bus segment 68 may contact second end 68B of another bus segment. First and second bus segments 68 may be in contact only at a corner or corners of bus segments 68. Thus, although first and second bus segments 68 may both be disposed on substrate and are in contact with one another, they are not in a stacked configuration, with part of one bus segment 68 on top of part of another bus segment 68, but rather lie flat on substrate 20, 24. This arrangement may allow for a thinner electro-optic element 10, but may still have higher resistance due to the limited contact between bus segments 68 than desirable.

Figure 6C:
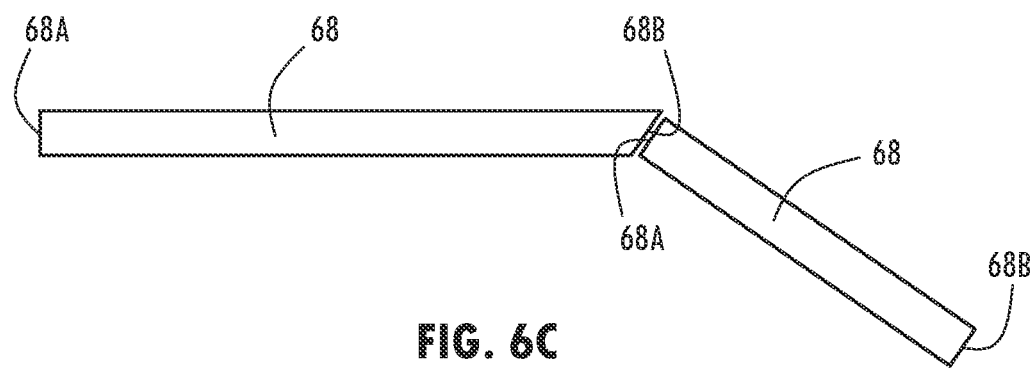
FIG. 6C illustrates a third configuration of the placement of two bus segments in relation to one another in accordance with this disclosure.

In some embodiments, to reduce resistance between bus segments 68, at least one of the ends of bus segments 68 that are to be disposed end-to-end with one another may be angled, and first bus segment 68 and second bus segment 68 may be in contact along all or part of the length of the ends of the bus segments 68. As shown in FIG. 6C, a second end 68B of a first bus segment 68 is angled while a first end 68A of a second bus segment 68 is not angled, although both second end 68B of first bus segment 68 and first end 68AB of second bus segment 68 may be angled and still be within the scope of this disclosure. The angled end may increase the interface between second end 68B of first bus segment 68 and first end 68A of second bus segment 68 while still keeping both bus segments 68 on the same plane rather than stacking them. This may reduce resistance between first bus segment 68 and second bus segment 68 without affecting the required cell spacing.

Figure 6D:
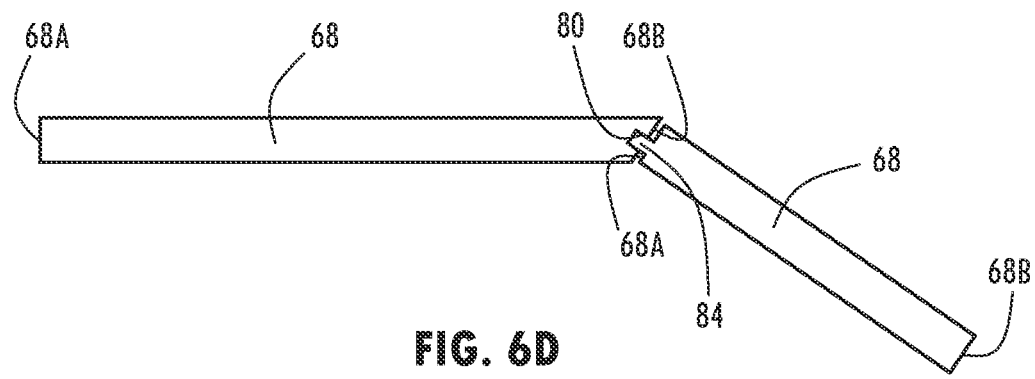
FIG. 6D illustrates a fourth configuration of the placement of two bus segments in relation to one another in accordance with this disclosure.

In another embodiment, as shown in FIG. 6D, to further increase the interface between first and second bus segments 68, a finger or other protrusion 80 may extend from a first end 68A of first bus segment 68, and may fit into an opening 84 defined by second end 68B of second bus segment 68.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

In this document, relational terms, such as first and second, top and bottom, front and back, left and right, vertical, horizontal, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications. Furthermore, it is to be understood that the device may assume various orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood that any described processes or steps within described processes may be combined with other disclosed processes or steps to form structures within the scope of the present disclosure. The exemplary processes disclosed herein are for illustrative purposes and are not to be construed as limiting. It is also to be understood that variations and modifications can be made on the aforementioned methods without departing from the concepts of the present disclosure, and further it is to be understood that such concepts are intended to be covered by the following claims unless these claims by their language expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within at least one of 2% of each other, 5% of each other, and 10% of each other.

The invention claimed is:

1. An electro-optic element, comprising:
a first substrate having an inner surface;
a second substrate having an inner surface opposed to the inner surface of the first substrate, the second substrate generally parallel to and coextensive with the first substrate;
a first bus having a first bus segment disposed on the inner surface of the first substrate and extending along a first portion of a perimeter of the first substrate and a second bus segment disposed on the inner surface of the first substrate and extending along a second portion of the perimeter of the first substrate;
a second bus having a third bus segment disposed on the inner surface of the second substrate and extending along a first portion of a perimeter of the second substrate in parallel with the first bus segment of the first bus and a fourth bus segment disposed on the inner surface of the second substrate and extending along a second portion of the perimeter of the second substrate in parallel with the second bus segment of the first bus; and
a controller configured to be in selective electrical communication with the first and second buses and capable of independently controlling a voltage applied to the first bus segment and the second bus segment of the first bus and a voltage applied to the third bus segment and the fourth bus segment portion of the second bus,
wherein the second bus segment is in a spaced apart relationship with the first bus segment of the first bus and the fourth bus segment is in a spaced-apart relationship with the third bus segment of the second bus,
wherein the first bus segment is closer to the first portion of the perimeters of the first and second substrates than the third bus segment, and the second bus segment is closer to the second portion of the perimeters of the first and second substrates than the fourth bus segment,
wherein the first bus and the second bus have at least one external contact portion that extends past an edge of the first substrate to allow for an external electrical connection to the first bus and the second bus, and
wherein one of the first bus and the second bus comprises an anode and the other one of the first bus and the second bus comprises a cathode.

2. The electro-optic element of claim 1, wherein the first and third bus segments are straight.

3. The electro-optic element of claim 2, wherein the second and fourth bus segments are curved.

4. The electro-optic element of claim 1, wherein an electrically insulating material is disposed between first and second bus segments of the first bus and the corresponding third and fourth bus segments of the second bus, electrically isolating the first and second bus segments from the third and fourth bus segments.

5. The electro-optic element of claim 1, wherein an end of the first bus segment is angled and the angled end is disposed adjacent to an end of the second bus segment to increase the interface with the end of the second bus segment.

6. An electro-optic element, comprising:
a first substrate having an inner surface;
a second substrate having an inner surface opposed to the inner surface of the first substrate, the second substrate generally parallel to and coextensive with the first substrate;
a first bus having a first bus segment disposed on the inner surface of the first substrate and extending along a first portion of a perimeter of the first substrate and a second bus segment disposed on the inner surface of the first substrate and extending along a second portion of the perimeter of the first substrate;
a second bus having a third bus segment disposed on the inner surface of the second substrate and extending along a first portion of a perimeter of the second substrate and in proximity to the first bus segment of the first bus and a fourth bus segment disposed on the inner surface of the second substrate and extending along a second portion of the perimeter of the second substrate and in proximity to the second bus segment of the first bus; and
a controller configured to be in selective electrical communication with the first and second buses and capable of independently controlling a voltage applied to the first bus segment and the second bus segment of the first bus and a voltage applied to the third bus segment and the fourth bus segment portion of the second bus,
wherein a finger extends from the first end of the first bus segment and is configured to fit within an opening in the first end of the second bus segment.

7. An electrical bus system for an electro-optic element, comprising:
a first bus segment and a second bus segment, each having a first end and a second end, disposed on a surface of a first substrate of the electro-optic element; and
a third bus segment and a fourth bus segment, each having a first end and a second end, disposed on a surface of a second substrate of the electro-optic element, the surface of the second substrate being opposed to the surface of the first substrate, the second substrate generally coextensive with and parallel to the first substrate of the electro-optic element;
wherein the first bus segment and the second bus segment are disposed around at least a portion of a perimeter of the surface of the first substrate;
wherein the third bus segment and the fourth bus segment are disposed around at least a portion of a perimeter of the surface of the second substrate; and
wherein the second bus segment is in a spaced apart relationship with the first bus segment and the fourth bus segment is in a spaced-apart relationship with the third bus segment,
wherein the third bus segment is disposed generally parallel to and opposite the first bus segment and wherein the fourth bus segment is disposed generally parallel to and opposite the second bus segment, and
wherein the first bus segment is closer to the perimeters of the first and second substrates than the third bus segment, and the second bus segment is closer to the perimeters of the first and second substrates than the fourth bus segment, and
wherein the first and second bus segments comprise an anode and the third and fourth bus segments comprise a cathode.

8. The electrical bus system of claim 7, wherein the second end of the first bus segment is in proximity to the first end of the second bus segment.

9. The electrical bus system of claim 7, wherein at least the first and third bus segments are straight.

10. The electrical bus system of claim 7, wherein at least the second and fourth first bus segments are curved.

11. The electrical bus system of claim 7, wherein the third bus segment has generally the same configuration as the first bus segment and the fourth bus segment has generally the same configuration as the second bus segment.

12. The electrical bus system of claim 7, wherein an electrically insulating material is disposed between the first bus segment and the third bus segment and between the second bus segment and the fourth bus segment in such a way as to electrically isolate the first and second bus segments from the third and fourth bus segments.

13. The electro-optic element of claim 6, wherein the first and third bus segments are straight.

14. The electro-optic element of claim 13, wherein the second and fourth bus segments are curved.

15. The electro-optic element of claim 6, wherein the third bus segment is disposed generally parallel to the first bus segment and the fourth bus segment is disposed generally parallel to the second bus segment.

16. The electro-optic element of claim 6, wherein an electrically insulating material is disposed between first and second bus segments of the first bus and the corresponding third and fourth bus segments of the second bus, electrically isolating the first and second bus segments from the third and fourth bus segments.

17. The electro-optic element of claim 6, wherein the second bus segment is in a spaced apart relationship with the first bus segment of the first bus and the fourth bus segment is in a spaced-apart relationship with the third bus segment of the second bus.

* * * * *